Figure 1A:
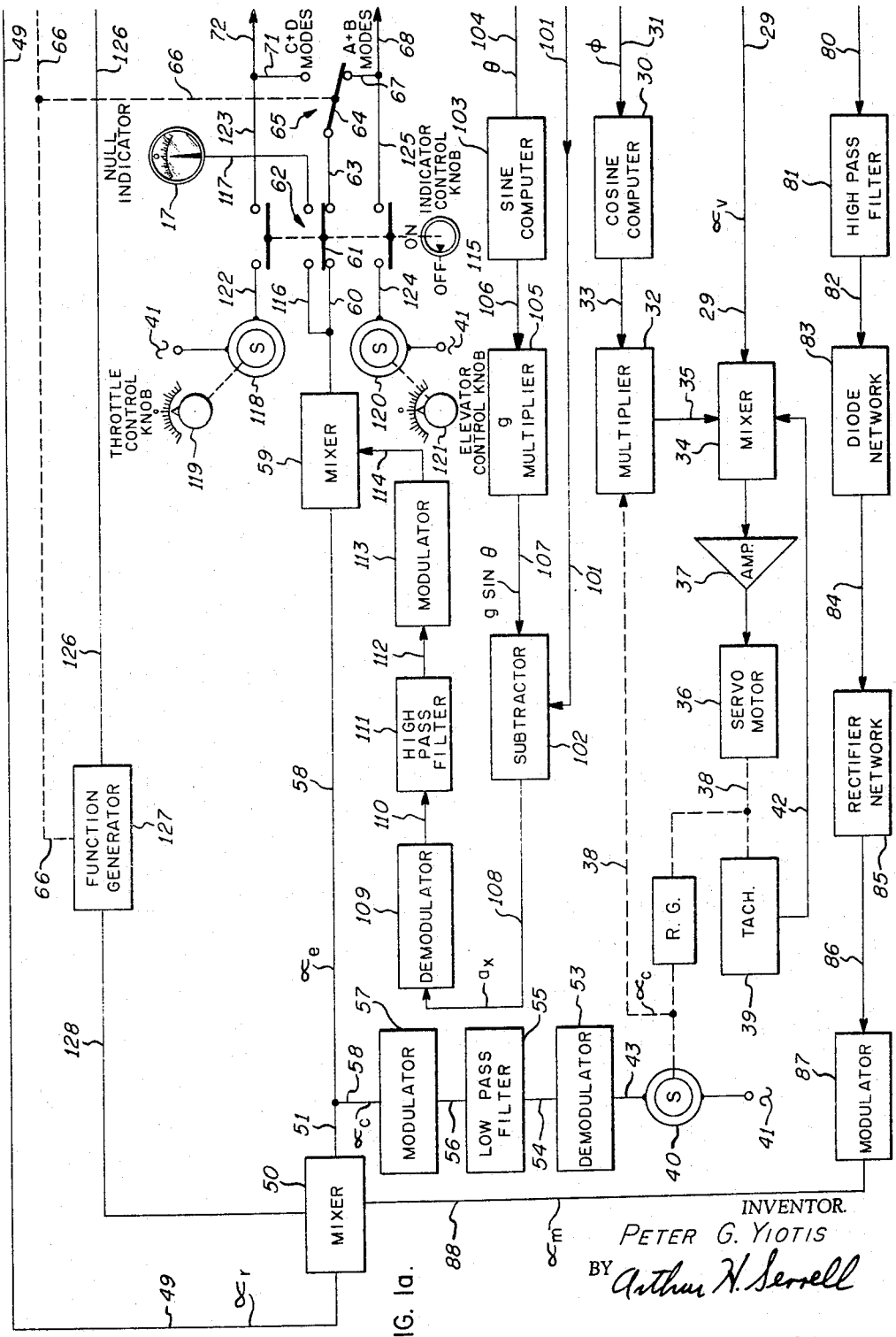

Sept. 27, 1966 P. G. YIOTIS 3,275,269

DUAL PERIOD AIRCRAFT CONTROL SYSTEM

Filed Oct. 23, 1963 2 Sheets-Sheet 1

INVENTOR.
PETER G. YIOTIS
BY Arthur H. Serrell
ATTORNEY

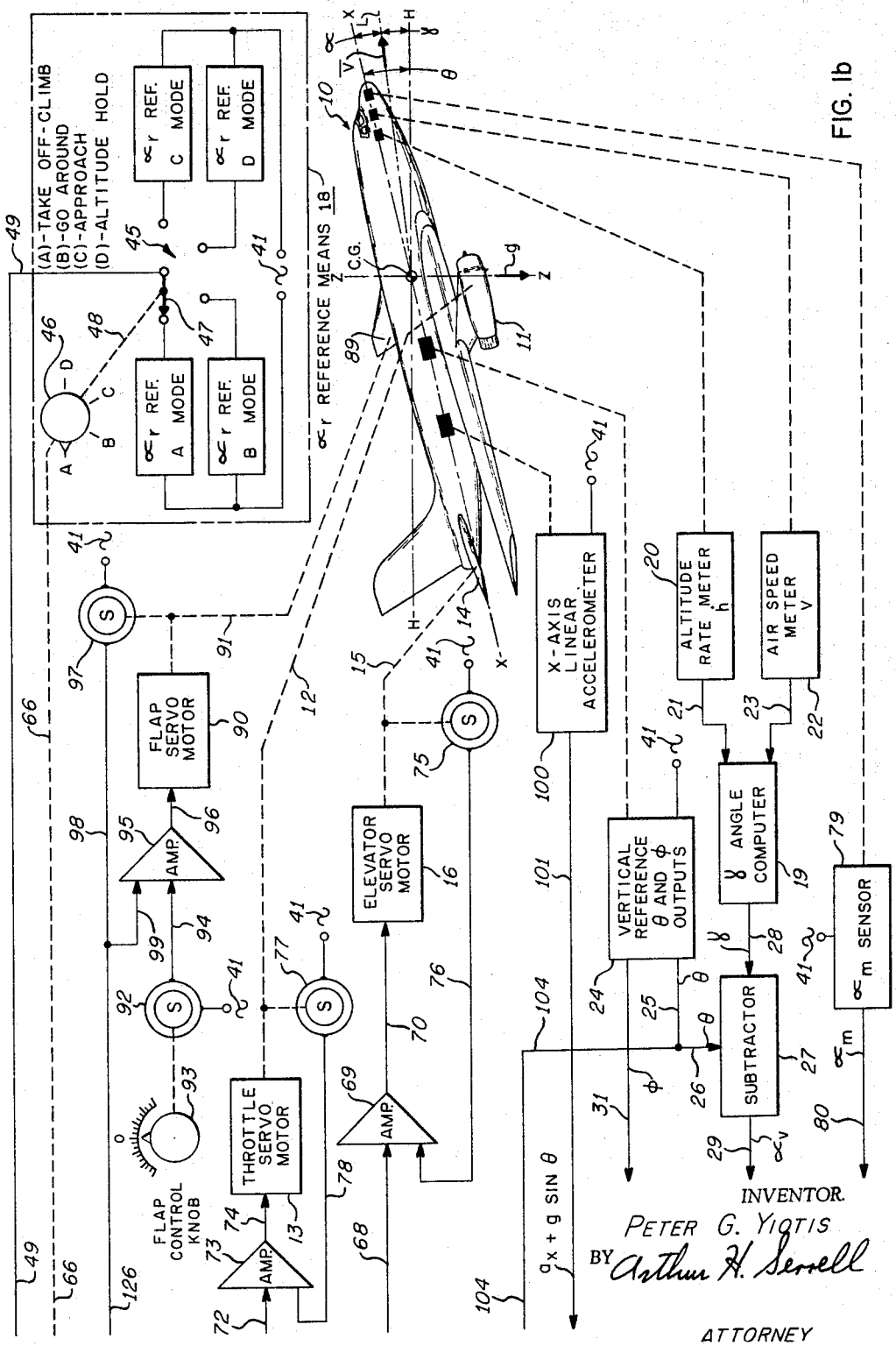

United States Patent Office 3,275,269
Patented Sept. 27, 1966

3,275,269
DUAL PERIOD AIRCRAFT CONTROL SYSTEM
Peter G. Yiotis, Astoria, N.Y., assignor to Sperry Rand Corporation, Great Neck, N.Y., a corporation of Delaware
Filed Oct. 23, 1963, Ser. No. 318,336
17 Claims. (Cl. 244—77)

This invention relates to an improvement in aircraft control systems of the dual period type. More particularly, the system controls the flight path angle ($\gamma$) and forward speed ($\bar{V}$) of an aircraft through a monitor that is common to a long period stabilizing loop with an inertial angle of attack computer and a short period stabilizing loop with a longitudinally oriented accelerometer.

The improved system includes means for providing a reference angle of attack output ($\alpha_r$) for each of four operational modes of the aircraft such as take-off climb, go-around, approach and altitude hold. In automatic operation in the take-off climb or go-around modes, the elevator servomotor functions as the monitor of the system to maintain the aircraft at a flight path and speed condition that matches the reference requirement. In similar operation in the approach or altitude hold modes, the monitor is provided by the prime mover of the aircraft and its throttle servomotor to obtain the speed condition that matches the reference requirement. In the form of the invention where the monitoring means includes a null indicator, the aircraft is controlled through the throttle or elevator servomotors by a human pilot observing the indicator to properly bring the system into balance by nulling the indicator.

In the improved system, the angle of attack ($\alpha$) of the aircraft is determined by inertial means rather than by a direct aerodynamic type sensor which is subject to error due to local flow distortions at the specific location of the sensor on the aircraft. Here during level flight conditions a more precise measure of angle of attack of the aircraft is provided by determining the flight path and pitch tilt angles of the aircraft and by subtracting the first of the noted angles from the second angle. The computed angle ($\alpha_c$) is dependent on the attitude of the moving aircraft per se and is inertial rather than aerodynamic in character. The elements constituting the inertial means providing a computed angle of attack output ($\alpha_c$) are included in the long period stabilizing loop of the improved system.

The accelerometer included in the short period loop of the improved system instantaneously senses changes in the thrust or forward speed vector of the aircraft to prevent the occurrence of oscillation at the established flight path condition.

The primary object of the present invention is to provide a dual period aircraft control system with a monitor for the flight path and speed condition of the aircraft that includes an angle of attack reference output ($\alpha_r$), an inertial means providing a computed angle of attack output ($\alpha_c$), and an accelerometer with an output depending on the change in speed of the aircraft along its longitudinal axis.

One of the features of the invention resides in the inclusion in a dual period control system of the character described of a means for monitoring both the flight path angle ($\gamma$) and forward speed ($\bar{V}$) conditions of the aircraft.

Another feature of the invention is provided by the inclusion in the long period loop of the improved system of a means for providing a reference angle of attack output ($\alpha_r$) and an output depending on the position of the flaps of the aircraft.

Still a further feature of the invention resides in the inclusion of means in the long period loop of the dual period system for compensating the aircraft for the effect of wind gusts thereon.

Other objects, features and details of the invention will become apparent from the following description when read in relation to the accompanying two sheets of drawing identified as FIG. 1A and FIG. 1B that combine to provide a single schematic view and circuit diagram showing a preferred embodiment thereof in which an aircraft is illustrated in a climbing condition of flight.

As shown in the drawing, the longitudinal axis X—X of the fuselage 10 of the represented aircraft is displaced from an axis H—H lying in a horizontal plane by a pitch angle ($\theta$), the axes X—X and H—H lying in a vertical plane including the vertical axis Z—Z. The axes intersect at the center of the gravity of the aircraft and the vector ($g$) lying along axis Z—Z represents gravitational acceleration. The aircraft shown is moving in the direction of the vector ($\bar{V}$) along a line of flight (L) in the plane defined by the axes H—H and X—X. The angle of attack ($\alpha$) of the aircraft is the angle in the plane including the axis Z—Z between the line of flight (L) and the longitudinal axis X—X. The flight path angle ($\gamma$) of the aircraft is the angle in the plane including the axis Z—Z between the line of flight (L) and the horizontal axis H—H. The sum of the angles ($\alpha$) and ($\gamma$) equals the pitch angle ($\theta$). The improved system monitors both the flight path angle ($\gamma$) and forward speed ($\bar{V}$) of the aircraft in accordance with a reference angle of attack ($\alpha_r$) established for the represented take-off climb mode (A) as well as for flight conditions indicated in the drawing as go-around mode (B), approach mode (C) and altitude hold mode (D).

The line of flight (L) of the aircraft is controlled in the improved system through a combination using both the prime movers as well as the elevators of the aircraft. As shown, a prime mover or engine 11 on the aircraft includes a conventional throttle control means that is connected by shafting 12 to a throttle servomotor 13. Also, the elevators 14 on the aircraft are connected by shafting 15 to an elevator servomotor 16. In flight modes (A) and (B), the elevator servomotor 16 is operative to vary the pitch angle ($\theta$) to obtain the desired result for a given throttle setting of the prime mover 11. In the flight modes (C) and (D), the throttle servomotor 13 is operative to vary the thrust exerted by the prime mover 11 along the X—X axis of the aircraft to obtain the desired result for a given pitch angle ($\theta$). The system is also effective where the noted servomotors are directly controlled by a human pilot while observing a null indicator 17.

The long period stabilizing loop of the improved system includes the aircraft, a means for providing a reference angle of attack ($\alpha_r$) output for a particular flight condition indicated at 18, and a plurality of elements constituting an inertial computer or computing means that provides an output according to the computed attack angle ($\alpha_c$) of the moving aircraft depending on its attitude in flight. As shown in the drawing, the computer includes means for providing an output depending on the flight path angle ($\gamma$) of the aircraft. Such an output is obtained by combining a measure of air speed (V) with a measure of the rate of change of altitude ($\dot{h}$) of the aircraft in an ($\gamma$) angle computer 19. As shown, an altitude rate meter 20 carried by the aircraft feeds an output ($\dot{h}$) to the computer 19 by way of lead 21. The measurement of ($\dot{h}$) by meter 20 is of a nature that provides an accurate, broadband output in the frequency range of 0 to 1.0 radian per second, which is typically the bandwidth of aircraft response to inertial flight path angle disturbances due to wind gusts. A conventional air speed meter 22 also carried by the aircraft feeds an output (V) to the computer 19 by way of lead 23. The (V) output of meter 22 to the flight path angle computer 19 is suitably filtered so as to encompass only frequency components within the range of 0 to 1.0 radian per second. The attack angle computing means further includes means in the form of a vertical reference 24 which is also carried by the aircraft that provides a pitch angle ($\theta$) output as well as a bank angle ($\phi$) output. The vertical reference 24 is fully responsive to changes in pitch and roll angles within the frequency range of 0 to 1.0 radian per second which is typically the bandwidth of aircraft response to attitude disturbances due to wind gusts. In the improved system, leads 25 and 26 feed the ($\theta$) output of the vertical reference 24 to a subtractor 27. A lead 28 carrying the output ($\gamma$) from the computer 19 also connects with the subtractor 27. As the difference between the angles ($\theta$) and ($\gamma$) is the component of angle of attack ($\alpha$), in the vertical plane defined by the axes Z—Z and H—H, the noted output ($\alpha_v$) is carried by the output lead 29 of the subtractor 27. The inertial angle of attack computer of the system accordingly includes means for subtracting a flight path angle output ($\gamma$) from a pitch angle output ($\theta$).

In the improved system, the output of the subtractor 27 as the computed vertical attack angle ($\alpha_v$) is multiplied by the secant of the bank attitude angle ($\phi$) to compensate for tilt of the aircraft about the X—X axis, and thereby obtain the computed aircraft angle of attack ($\alpha_c$). The circuit arrangement shown in the drawing to obtain this result includes a cosine computer 30 connected to the ($\phi$) output lead 31 of the vertical reference 24. The cosine function of output ($\phi$) from the computer 30 is fed to a multiplier 32 by way of lead 33. Mixer 34 connected to ($\alpha_c$) lead 29 and to an output lead 35 from the multiplier 32 provides an operating input to a servomotor 36 by way of amplifier 37. Shafting 38 from the servomotor 36 provides a shaft position input to the multiplier 32, drives the movable element of a feedback tachometer 39 and the movable element of a synchro 40 that is energized by a suitable source of alternating current 41. Feedback lead 42 connects the tachometer 39 to the mixer 34. The described circuitry combines the ($\phi$) and ($\alpha_v$) outputs to provide a ($\alpha_v$ sec $\phi$) or ($\alpha_c$) output on both the shafting 38 and an output lead 43 from the synchro 40. As the difference between the pitch angle ($\theta$) and flight path angle ($\gamma$) multiplied by the secant of the roll angle ($\phi$), the computed angle ($\alpha_c$) is in the X—X axis and Z—Z axis plane of the aircraft with respect to the X—X axis where it is assumed in coordinated turns that (1) the side slip angle is zero, (2) that the path angle ($\gamma$) between the ground plane projection of the aircraft X—X axis and flight path is small, i.e. cosine ($\gamma$)=1 and (3) the angle ($\alpha$)=the tangent of the angle ($\alpha$). To preserve computational accuracy, the described computer servo has a bandpass equal to or greater than 1.0 radian per second which corresponds to the maximum pitch, roll, and flight path input signal frequencies resulting from gust disturbances.

Characteristically, the computed angle of attack ($\alpha_c$) output is an inertial quantity, i.e. where the aircraft body axes and velocity vector are referenced to earth axes. This holds for all aircraft disturbances of any frequency including the zero frequency or steady state condition.

The system operation to change the attitude or forward speed of the aircraft so that its computed angle of attack ($\alpha_c$) as determined by the computer circuit output on lead 43 matches the output ($\alpha_r$) of the reference means 18. The values of the fixed angle of attack references ($\alpha_r$) for each of the individual A, B, C, and D modes of flight varies between aircraft types and use. For approach and altitude hold modes (C and D), the ($\alpha_r$) is selected so that the recommended air speeds evolve. For take-off and go-around climb modes (A and B), one typical criteria is to select the angle of attack for maximum lift to drag ratio at which maximum climb performance is realized. In each case, the reference angle ($\alpha_r$) is selected independent of the aircraft gross weight. As shown, individual ($\alpha_r$) reference output elements for each mode are energized from the source 41 and connect with the four terminals of a mode switch 45. The setting knob 46 of the switch 45 positioned in the (A) mode connects the single slider or switch arm 47 by shafting 48 to close the circuit from the ($\alpha_r$) reference (A) mode to a servo input lead 58 by way of lead 49, mixer 50 and connecting lead 51.

As shown, synchro 40 is electrically connected to the respective servomotors 16 and 13 of the long period stabilizing loop of the system by way of lead 43, demodulator 53, lead 54, low pass filter 55, lead 56, modulator 57, lead 58, mixer 59, lead 60, the center blade 61 of a make-break gang switch 62, lead 63, the blade 64 of a make-break switch 65 controlled by shafting 66 from mode switch 45 and closed to the (A) and (B) mode terminal, lead 67, lead 68 to amplifier 69 and lead 70 to the servomotor 16. The branch of the open circuit shown to the servomotor 13 includes the (C) and (D) mode terminal of the switch 65, lead 71, lead 72 to amplifier 73 and lead 74 to the servomotor 13. The feedback circuit for the servomotor 16 includes a synchro 75 whose rotor is connected to shafting 15 and whose stator is connected to amplifier 69 by lead 76. A feedback synchro 77 functions in a similar manner for the servomotor 13 where lead 78 connects its stator to the amplifier 73 and its rotor is connected to shafting 12.

The low pass filter 55 included in the long period stabilizing loop of the system blocks the major portion of the high frequency components of ($\alpha_c$) resulting from gusty wind conditions. The resistance and capacitance of the filter are selected at a value such that disturbances above a predetermined frequency of approximately 0.2 radian per second are attenuated. The angle of attack loop accordingly is only responsive to control signals below the predetermined frequency. Thus the long period stabilization loop attenuates the effects of wind and gust disturbances on constant angle of attack control below 0.2 radian per second. The components of the angle of attack loop in the improved system are also so chosen that the response time is relatively slow with relation to the response time of the hereinafter described inertial speed change sensing or accelerometer loop and the gain of the overall loop is relatively low as compared with the gain of the latter loop. The angle of attack servo loop accordingly functions to provide long period control of aircraft angle of attack so as to maintain the average angle of attack of the aircraft at the desired value. As the higher frequency gust components of the control signals for this servo loop have been eliminated, over control by either the throttle servomotor or elevator servomotor is avoided.

In any of the mode conditions of operation of the system as determined by the setting of the mode switch 45 by the human pilot, the monitoring means of the system is responsive to the difference or error output ($\alpha_e$) between the output of the reference means ($\alpha_r$) and the inertial attack angle computer output ($\alpha_c$). In the modes (A) and (B), the error output ($\alpha_e$) is fed to the elevator servomotor 16 to control the flight path and forward speed of the aircraft with the prime mover 11 operating at fixed throttle. The operation is such that the aircraft element of the system assumes a flight path and speed condition where the computed attack angle ($\alpha_c$) is in balance with the reference output ($\alpha_r$) and hence the output ($\alpha_e$) is zero. In the (C) and (D) modes the error output ($\alpha_e$) is fed to the throttle servomotor 13 to control the forward speed of the aircraft, pitch attitude being held substantially constant.

To prevent the approach of the aircraft to a stall condition due to gusty wind conditions, the system includes a means of compensating for the effect of these higher frequency disturbances on aerodynamic angle of attack. As shown, such means includes an aerodynamic sensor 79 providing a measured angle of attack output ($\alpha_m$) carried by the aircraft, the steady-state accuracy of which is unimportant. To avoid overlapping of measurement relative to the ($\alpha_e$) computer, the average value of the output sensor of 79 is removed by applying the output lead 80 of the sensor 79 to a high-pass filter 81. The resistance and capacitance elements of the filter 81 are selected so as to pass only the frequencies of craft disturbances above .2 radian per second. The resultant output is then fed by way of lead 82 to a diode network 83 that passes only the positive polarity components of the filtered signal corresponding to an increase in the measured angle of attack. The output of network 83 is fed by lead 84 to a rectifier network 85 which functions to generate and hold a signal representing the peak positive deviation of ($\alpha_m$) from the average. The network 85 consists of capacitor and resistor elements connected in parallel such that the response of the network to increases in angle of attack is instantaneous. The discharge time constant of the rectifier network is chosen so as to provide a smooth signal output for all ($\alpha_m$) signal frequencies above .2 radian per second. Accordingly, the described gust compensating circuit provides an output on lead 86 to mixer 50 by way of modulator 87 and lead 88, proportional to the peak positive deviation of aerodynamic angle of attack from the average and in opposing relation to the output of the ($\alpha_r$) reference means 18. Thus the ($\alpha_r$) output is effectively reduced during turbulent wind conditions so as to maintain a safe margin from stall.

Where the aircraft includes flaps 89 and a flap servomotor 90 connected to the flaps by shafting 91, the output of the reference means 18 to the long period stabilizing angle of attack loop is modified by providing an input to the mixer 50 that depends on the position of the flap from a null condition. This compensates the system for changes in the zero lift chord of the aircraft when the flaps are set by the human pilot in other than the null condition. To position the flaps in accordance with the flight condition of the aircraft, the system includes a flap control synchro 92 whose rotor is connected to a flap control knob 93 set by the human pilot. The output of synchro 92 is fed to the servomotor 90 by way of lead 94, amplifier 95 and lead 96. The follow-up circuit for the flap positioning means includes a synchro 97 whose rotor is connected to the shaft 91. The output of synchro 97 is fed in degenerative relation to amplifier 95 by way of leads 98 and 99. The output of synchro 97 is also applied to the mixer 50 by way of connecting lead 126, a function generator 127 and lead 128. The function generator 127 contains circuits which operate on the flap position signal to produce a ($\alpha_r$) correction signal in accordance with a predetermined mathematical function. The correction function required depends on the aircraft in which the system is used and the aforementioned criteria used in establishing the ($\alpha_r$) for each of the modes A, B, C, and D. For example, in the take-off climb mode in which the system is shown, if the angle of attack for maximum lift-to-drag ratio is selected for ($\alpha_r$), the flap correction function would reflect the change in $\alpha$ for maximum lift-to-drag ratio that occurs with flap change. The function generator comprises separate circuits for each of the flight modes A, B, C, and D, as well as suitable switching which is activated from setting knob 46 by way of shafting 66 and functions to select the proper circuit to operate on the flap signal.

The accelerometer loop of the system operates to provide short period stabilization of angle of attack by sensing changes in the inertial speed of the aircraft along its longitudinal axis X—X. In the dual loop system of the present invention, the short period loop performs two basic functions. First, it senses sudden changes in the net thrust-drag vector of the aircraft, as may be caused by engine failure or changes in aircraft configuration, so as to provide the higher order anticipation necessary to damp natural modes of oscillation such as phugoid, and thereby provide a safe transition to a new equilibrium flight condition. Secondly, the short period loop acts to attenuate the effects of wind gust or maneuvering disturbances on inertial angle of attack between .2 to 1.0 radian per second. As shown, the short period loop of the system includes an X-axis linear accelerometer indicated at 100 that is carried by the aircraft. Accelerometer 100 is preferably mounted on the aircraft at the approximate location of its center of gravity on the longitudinal axis X—X to provide an output ($a_x$) that depends on changes in the forward speed of the aircraft. In the short period loop of the system, lead 101 feeds the signal of the velocity change sensor or accelerometer 100 to a subtractor 102 as an output ($a_x + g \sin \theta$) where ($g$) is gravitational acceleration and ($\theta$) is the pitch angle of the aircraft in its noted flight condition.

The means provided to correct the output of the accelerometer to cancel the factor ($g \sin \theta$) includes a sine computer 103 connected to the ($\theta$) output lead 25 from the vertical reference 24 by lead 104, a ($g$) multiplier 105 connected to the computer 103 by lead 106, and lead 107 carrying the output ($g \sin \theta$) to the subtractor 102. The circuit connecting the substractor 102 to the mixer 59 of the system includes lead 108 carrying the corrected output ($a_x$), demodulator 109, lead 110, high pass filter 111, lead 112, modulator 113 and lead 114. The filter 111 in the short period acceleration loop of the system passes the components of the ($a_x$) signal of a frequency that are blocked by the filter 55 in the angle of attack loop of the system. Accordingly, the frequencies passed by filter 111 are above the point of differentiation of .2 radian per second. The monitoring servomotors 16 and 13 respond to the output ($a_x$) of the short period loop from the mixer 59 as well as the error output ($\alpha_e$). The ($a_x$) signal on lead 114 is phased so that a forward acceleration or increase in inertial speed will result in a pitch up or throttle retard command depending on the flight mode, until the algebraic sum of the ($\alpha_e$) and ($a_x$) correction signals is nulled and a new equilibrium condition of the aircraft achieved. The monitoring means of the improved system is a common element in each of the dual control loops that also include the aircraft. The system operates automatically through the elevator servomotor 16 in the (A) and (B) flight modes. It also operates in a similar manner through the throttle servomotor 13 in the (C) and (D) flight modes.

Where the system includes the null indicator 17, one of the servomotors 16, 13 is operated manually by the human pilot while the other is conditioned to provide a fixed output. In this connection, switch 62 is set by an indicator control knob 115 to its "on" position to close a circuit between the mixer 59 and indicator 17 by way of lead 116, the center blade of the gang switch 62 and lead 117. This opens the circuit between the mixer 59 and switch 65. The manually operable circuits closed by the change in setting of knob 115 include a synchro 118 whose rotor is connected to a throttle control knob 119 and a synchro 120 whose rotor is connected to the elevator control knob 121. The throttle synchro 118 is connected to amplifier 73 by way of lead 122, the top blade of the gang switch 62 and lead 123 to the lead 72. The elevator synchro 120 is likewise connected to amplifier 69 by way of lead 124, the bottom blade of the gang switch 62 and lead 125 to lead 68. In manual operation the human pilot adjusts one of the knobs 119, 121 while observing the indicator 17 to reduce the output of the mixer 59 to null as shown by the indicator. Any unbalance in the system appears in movement of the pointer of the indicator 17 which is corrected by the human pilot's adjustment of the proper knob 119, 121 to restore the system to balance where the algebraic sum of computed angle of attack and longitudinal acceleration of the aircraft matches the reference angle of attack as compensated by the output of the gust circuit and corrected by the output of the flap position circuit.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In a dual period control system for aircraft, means for monitoring the flight path and forward speed of the aircraft, an inertial computer providing an angle of attack output depending on the tilt attitude and forward speed of the aircraft, means providing a reference angle of attack output for a particular aircraft condition of flight, a long period stabilizing loop including the aircraft, the monitoring means, the computer and the reference means in which the monitoring means is responsive to the difference between the outputs of the computer and reference means, means providing an output depending on the acceleration of the aircraft along its longitudinal axis, means for correcting the output of acceleration output means for the effect of gravity on the aircraft, and a short period stabilizing loop including the aircraft, the monitoring means, the acceleration output means and the correcting means in which the monitoring means is responsive to the corrected output of the acceleration output means.

2. A system of the character claimed in claim 1, in which the inertial computer includes means for providing an output depending on the tilt of the aircraft about its pitch axis, means for providing an output depending on the flight path angle of the aircraft, and means for subtracting the output of the flight path angle output means from the output of the pitch tilt output means.

3. A system of the character claimed in claim 2, including means for multiplying the output of the subtracting means by the secant of the tilt of the aircraft about its longitudinal axis.

4. A system of the character claimed in claim 1, in which the aircraft includes a prime mover with a throttle valve, and the monitoring means of the combination includes a servomotor operatively connected to the throttle valve of the prime mover.

5. A system of the character claimed in claim 1, in which the aircraft includes elevators, and the monitoring means of the combination includes a servomotor operatively connected to the elevators.

6. A system of the character claimed in claim 1, in which the monitoring means of the combination includes a null indicator.

7. A system of the character claimed in claim 1, in which the aircraft includes flaps, means for positioning the flaps in accordance with the flight condition of the aircraft, means depending on the position of the flaps for providing an output, and the long period stabilizing loop includes the flap output means.

8. A system of the character claimed in claim 1, in which the long period stabilizing loop includes means for compensating the system for the effect of wind gusts on the aircraft having an aerodynamic angle of attack sensor with an output.

9. A dual period control system for aircraft having a prime mover with a throttle valve including a servomotor operatively connected to the throttle valve to monitor the flight path and forward speed of the aircraft, inertial means providing an angle of attack output, means providing a reference angle of attack output for a particular aircraft condition of flight, a long period stabilizing loop including the aircraft, the servomotor, the inertial means and the reference means in which the servomotor is responsive to the difference between the output of the inertial means and the reference means, means providing an output depending on the acceleration of the aircraft along its longitudinal axis, means for correcting the output of the acceleration output means for the effect of gravity on the aircraft, and a short period stabilizing loop including the aircraft, the servomotor, the acceleration output means and the correcting means in which the servomotor is responsive to the corrected output of the acceleration output means.

10. A system of the character claimed in claim 9, in which the inertial output means includes a vertical reference having pitch and bank outputs, a computer providing an output depending on the flight path angle of the aircraft, means for subtracting the output of the flight path computer from the pitch output of the vertical reference, and means for multiplying the output of the subtracting means by the secant of the bank output of the vertical reference.

11. A system of the character claimed in claim 9, in which the aircraft includes flaps, means for positioning the flaps in accordance with the flight condition of the aircraft, means depending on the position of the flaps for providing an output, and the long period stabilizing loop includes the flap output means.

12. A dual period control system for aircraft having elevators including a servomotor operatively connected to the elevators to monitor the flight path and forward speed of the aircraft, inertial means providing an angle of attack output, means providing a reference angle of attack output for a particular aircraft condition of flight, a long period stabilizing loop including the aircraft, the servomotor, the inertial means and the reference means in which the servomotor is responsive to the difference between the output of the inertial means and the reference means, means providing an output depending on the acceleration of the aircraft along its longitudinal axis, means for correcting the output of the acceleration output means for the effect of gravity on the aircraft, and a short period stabilizing loop including the aircraft, the servomotor, the acceleration output means and the correcting means in which the servomotor is responsive to the corrected output of the acceleration output means.

13. A system of the character claimed in claim 12, in which the inertial output means includes a vertical reference having pitch and bank outputs, a computer providing an output depending on the flight path angle of the aircraft, means for subtracting the output of the flight path computer from the pitch output of the vertical reference, and means for multiplying the output of the subtracting means by the secant of the bank output of the vertical reference.

14. A system of the character claimed in claim 12, in which the aircraft includes flaps, means for positioning the flaps in accordance with the flight condition of the aircraft, means depending on the position of the flaps for providing an output, and the long period stabilizing loop includes the flap output means.

15. In a dual period control system for aircraft, means for monitoring the flight path and forward speed of the aircraft including a null indicator, inertial means providing an angle of attack output, means providing a reference angle of attack output for a particular aircraft condition of flight, a long period stabilizing loop including the aircraft, the indicator, the inertial means and the reference means in which the indicator is responsive to the difference between the output of the inertial means and the reference means, means providing an output depending on the acceleration of the aircraft along its longitudinal axis, means for correcting the output of the acceleration output means for the effect of gravity on the aircraft, and a short period stabilizing loop including the aircraft, the indicator, the acceleration output means and the correcting means in which the indicator is responsive to the corrected output of the acceleration output means.

16. A system of the character claimed in claim 15, in which the inertial output means includes a vertical reference having pitch and bank outputs, a computer providing an output depending on the flight path angle of the aircraft, means for subtracting the output of the flight path computer from the pitch output of the vertical reference, and means for multiplying the output of the subtracting means by the secant of the bank output of the vertical reference.

17. A system of the character claimed in claim 15, in which the aircraft includes flaps, means for positioning the flaps in accordance with the flight condition of the aircraft, means depending on the position of the flaps for providing an output, and the long period stabilizing loop includes the flap output means.

References Cited by the Examiner

UNITED STATES PATENTS 3,077,557   2/1963   Joline et al. _____ 340—27 X
3,128,967   4/1964   Hays _____ 244—77

FERGUS S. MIDDLETON, *Primary Examiner*.